(12) United States Patent
Voorhees et al.

(10) Patent No.: US 7,539,798 B2
(45) Date of Patent: May 26, 2009

(54) MITIGATING PERFORMANCE DEGRADATION CAUSED BY A SATA DRIVE ATTACHED TO A SAS DOMAIN

(75) Inventors: William Voorhees, Colorado Springs, CO (US); Jason Williams, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 444 days.

(21) Appl. No.: 11/300,012

(22) Filed: Dec. 14, 2005

(65) Prior Publication Data

US 2007/0136521 A1    Jun. 14, 2007

(51) Int. Cl.
*G06F 12/00*   (2006.01)
(52) U.S. Cl. .................... 710/74; 710/8; 710/9; 710/10; 710/33; 710/72; 710/73; 711/114; 711/162; 711/112
(58) Field of Classification Search ............... 710/8–10, 710/33, 72–74; 711/114, 162, 112
See application file for complete search history.

(56) References Cited

U.S. PATENT DOCUMENTS 6,807,605 B2 * 10/2004 Umberger et al. ........... 711/114
6,954,712 B2 * 10/2005 Bingham et al. ............ 702/123
7,310,715 B2 * 12/2007 Forrer et al. ................ 711/162
2006/0129771 A1 * 6/2006 Dasgupta et al. ............ 711/162

* cited by examiner

*Primary Examiner*—Tammara Peyton
(74) *Attorney, Agent, or Firm*—William W. Cochran; Cochran Freund & Young LLC

(57) ABSTRACT

The present invention provides a device and method for mitigating performance degradation caused by SATA drives attached to a SAS domain. In one of the embodiments of the present invention, a SATA degradation mitigation device ("SDMD") is installed between a SAS domain and one or more SATA drives. The SDMD effectively reduces congestion on intermediate links by buffering SATA data and transmitting the data at a rate which is higher than the rate at which the SATA data is received from a drive. Conversely, write data from the SAS domain may be buffered at the SDMD at a higher rate and subsequently sent to the SATA drive at a lower rate. This SATA data buffering and subsequent increase in data rate improves the overall efficiency of a SAS domain storage system by reducing data congestion arising out of low-performance SATA drives clogging the intermediate links.

34 Claims, 5 Drawing Sheets

MITIGATING PERFORMANCE DEGRADATION CAUSED BY A SATA DRIVE ATTACHED TO A SAS DOMAIN

BACKGROUND

A. Technical Field

This invention relates to data storage and retrieval, and more particularly to the operation of a SATA drive that interfaces within a SAS domain.

B. Background of the Invention

The growth and importance of data storage technology are well known. This technology growth includes the development of different storage-related protocols and standards which define structures and methods by which data may be stored and retrieved. As a result of these changes, it is not uncommon for storage systems to have components that operate according to different standards and/or designs. In particular, as a storage system is built-out over time, new products and technologies may come to market that provide performance improvements and may be integrated within legacy systems. Conversely, legacy components and storage devices may be integrated within a storage system in order to keep costs down.

Storage devices may access, store and retrieve data using various techniques. The performance of a storage system may significantly depend on the manner in which its storage devices read and write data to and from disks. The reliability and speed of storage drives, and the corresponding interfaces between these devices thus become important elements of a storage system. Continual improvements in storage technology and standards have drastically improved the performance of serial communication, which has led to the integration of different serial-based interface components and storage drives being integrated within storage systems. Two such types of serially-based interface components and storage drives are Serial Advanced Attachment ("SATA") and Serial Attached SCSI ("SAS") devices.

SAS technology defines a point-to-point serial interface capable of full duplex communication at greater dedicated bandwidth than earlier interfaces, such as SATA. In order to aid the integration of SAS within the storage market, SAS technology was defined as being compatible with SATA. This compatibility allows the large number of pre-existing SATA storage devices to be integrated within SAS domains. In particular, the SAS topology allowed SATA-compliant interfaces to be connected within a SAS system domain. As a result, a user is able to install comparatively lower cost and poorer performing SATA drives and higher performing and more expensive SAS drives within a single SAS domain.

FIG. 1 shows an exemplary SAS domain 102 with a SATA storage drive 108 and SAS storage drive 110. A connection between the SATA drive 108 to the SAS domain 102 is made through expanders 104 and 106. An STP Initiator 102b is located within the SAS domain 102 that provides an interface for data from the SATA drive 108. The STP Initiator 102b operates according to the Serial ATA Tunneling protocol ("STP"). Comparatively, a SSP Initiator 102a receives data from the SAS drive 110 and operates according to the Serial SCSI protocol ("SSP").

The SAS Initiator 102b and the SSP Initiator 102a are connected to a first expander 104, which is connected to a second expander 106 that communicates with the SATA drive 108 and the SAS drive 110. The expanders 104, 106 improve the scalability of the Serial attached SCSI systems by allowing multiple end devices, such as the drives, to a plurality of Initiator devices.

The integration of SATA drives within an SAS domain creates data transfer inefficiencies caused by the comparably different effective data transfer rates between SATA and SAS. In particular, a delay caused by the SATA drives is attributed inherently to the way the SATA drives are designed and the flow control issued by SATA drives. This delay may cause data bottlenecks on intermediate links of the SAS topology because data paths may become congested with the lower rate SATA data. As a result, the data transfer between a SAS disk drive and the SSP Initiator 102a may be significantly delayed, reducing performance, due to the usage of intermediate links by the inefficient SATA drive.

There is a current need for a practical and cost effective solution that addresses congestion caused by SATA drives that are attached to a SAS domain.

SUMMARY OF THE INVENTION

The present invention provides a device and method for mitigating performance degradation caused by attaching SATA drives to a SAS domain. In one of the embodiments of the present invention, a SATA degradation mitigation device ("SDMD") is located between one or more SATA drives and a SAS domain. The SDMD effectively reduces congestion on an intermediate link(s) within a SAS domain. In particular, during a read transaction, the SDMD receives and buffers data from a SATA drive at a relatively lower rate and transmits the buffered data at a higher rate across the intermediate link(s) and to the STP Initiator within the SAS domain. Similarly, during a write transaction, the SDMD receives and buffers data from the STP Initiator at a higher rate, allowing disconnection from the intermediate links, and subsequently sends the data at a lower rate to the attached SATA drive. This SATA data buffering and subsequent increase in data rate improves the overall efficiency of a SAS domain storage system by reducing data congestion arising out of low-performance SATA drives clogging the intermediate data links and devices.

In one embodiment of the invention, an SDMD comprises control logic to monitor data transfer occurring between SATA drive and SAS domain, and provides different internal data paths that provide different functionality. The control logic monitors data traffic between the SATA drive and the SAS domain, and manages the data flow from the SATA drive and SAS domain accordingly. A first mode provides a data path in which communication (e.g., data, commands, etc.) between the SAS domain and the SATA drive flow through the SDMD without being buffered. A second mode provides a data path in which communication between the SATA drive and the SAS domain are buffered. In one embodiment, data from the SATA drive is buffered and subsequently transmitted to the SAS domain at a relatively higher rate than it was received from the SATA drive. Likewise, data to the SATA drive is buffered and then subsequently transmitted to the SATA drive at a relatively lower rate.

The SDMD may also comprise multiplexers and physical layer components that enable the device to interface with various different types of devices and domains. Accordingly, although the present invention will be described in relation to both SAS and SATA protocols, one skilled in the art will recognize that the invention may be applied to other types of storage technologies in which data congestion is generated due to protocol and/or rate mismatches.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A method, device and network topology for mitigating performance degradation of SATA drives attached to a SAS domain are described. An SDMD is located between a SATA drive and a SAS domain in order to reduce data congestion on intermediary devices, such as expanders, caused by the low rate of data transferred between the SATA drive and the STP Initiator within the SAS domain. As a result of the operation of the SDMD, additional bandwidth on the intermediary devices is made available for more efficient data transfers between a SAS drive(s) and an SSP Initiator. The SDMD may be integrated within various components, such as disk drives, or STP/SATA bridges, or expanders, or may be a discrete component.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different storage systems and devices therein. The embodiments of the present invention may also be present in hardware or firmware. Structures and devices shown in the figures are illustrative of exemplary embodiments of the invention and are meant to avoid obscuring the invention. Furthermore, connections between components and/or modules within the figures are not intended to be limited to direct connections. Rather, data between these components and modules may be modified, reformatted or otherwise changed by intermediary components and modules.

References in the specification to "one embodiment" or "an embodiment" means that a particular feature, structure, characteristic, or function described in connection with the embodiment is included in at lest one embodiment of the invention. The appearances of the phrase "in one embodiment" in various places in the specification are not necessarily all referring to the same embodiment.

A. Overview

Figure 1:
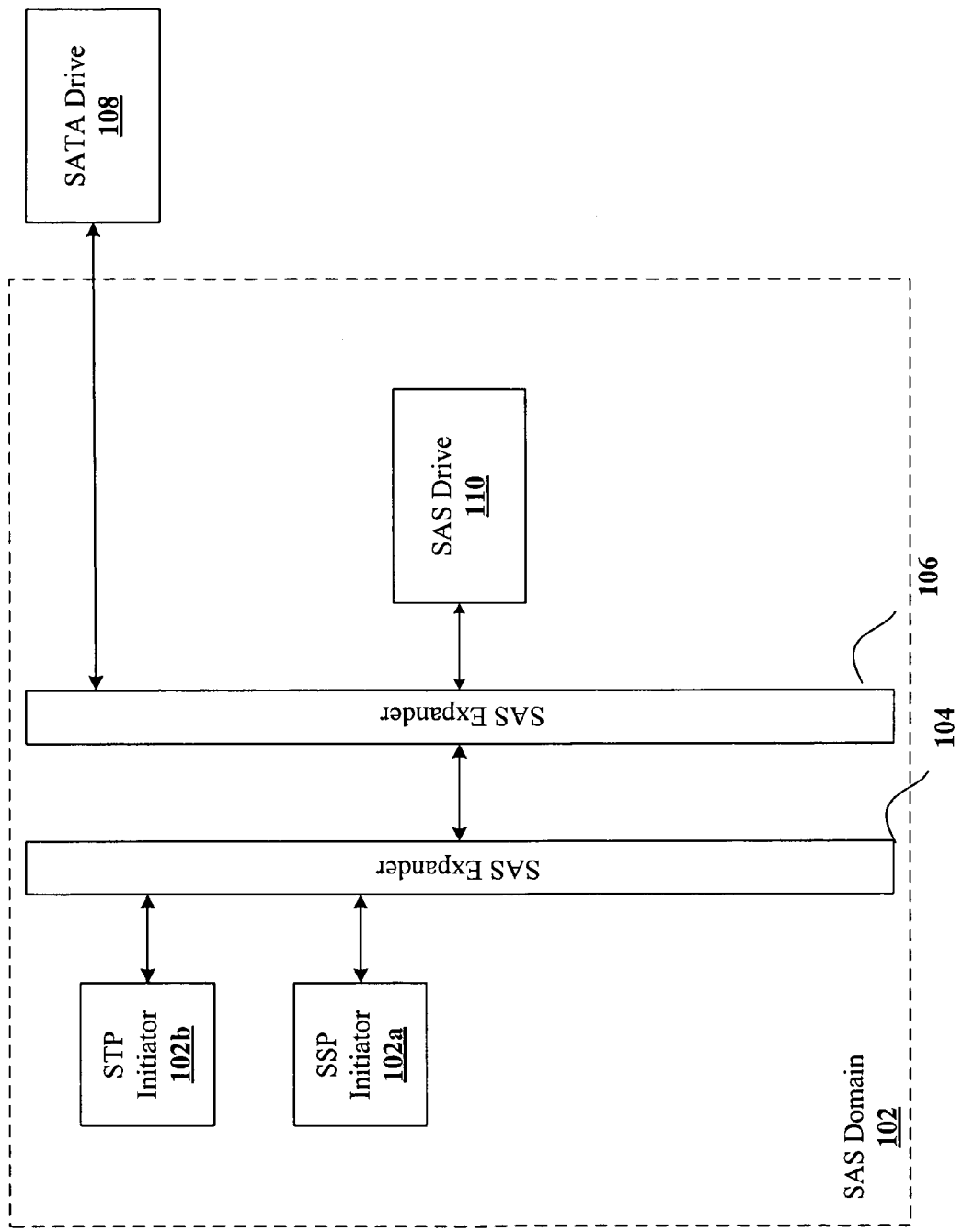
FIG. 1 shows a general block diagram of an exemplary SAS domain, with attached SATA drive and SAS drive through expanders.
Figure 2:
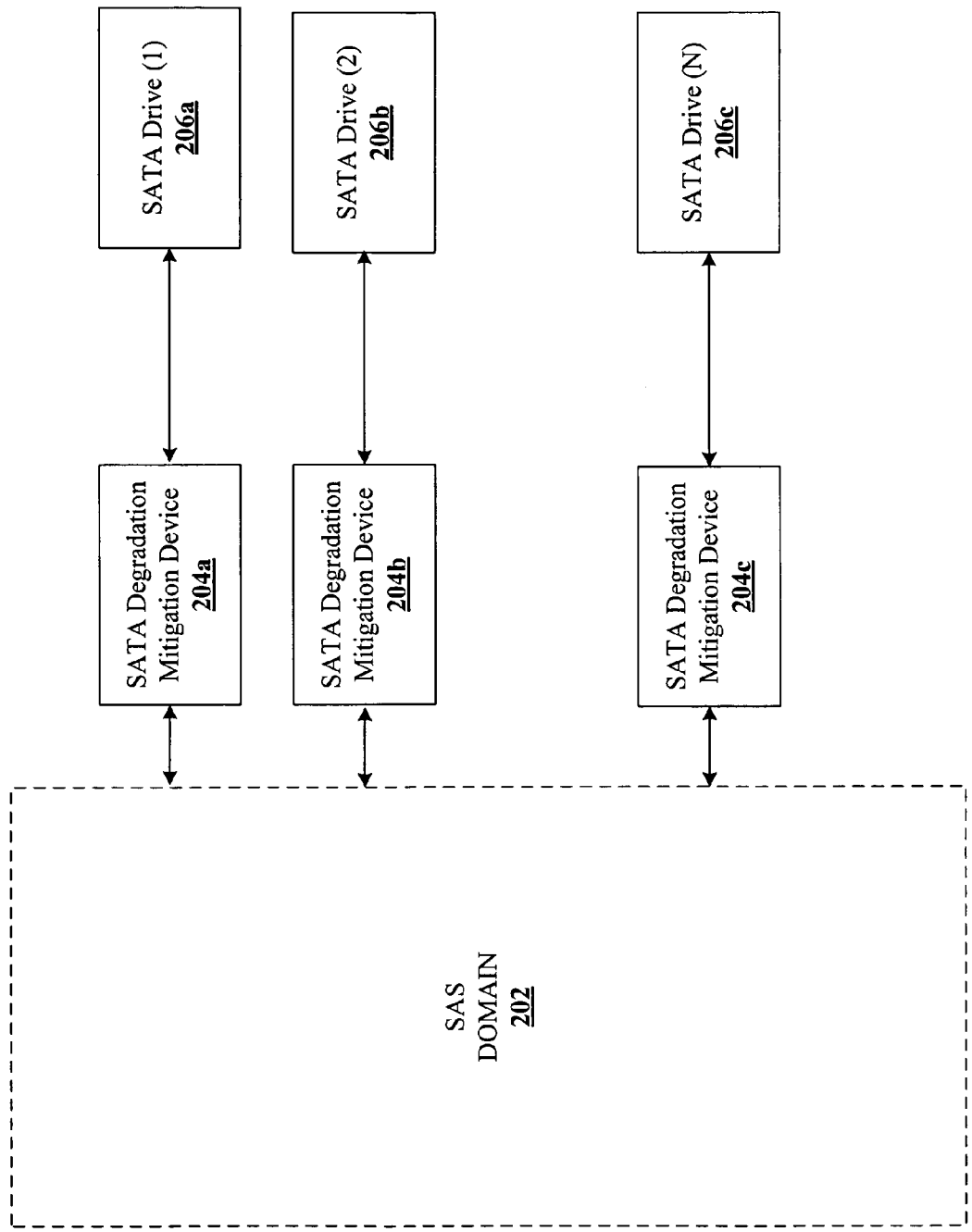
FIG. 2 illustrates a general block diagram of SDMDs connected between a SAS domain and SATA drives according to one embodiment of the invention.

FIG. 2 represents an exemplary implementation of an SDMD as devised by one embodiment of the present invention. A SAS domain 202, functioning as a controller domain, may consist of various SAS devices such as SAS Initiator devices or expander devices. An SDMD is located between the SAS domain 202 and one or more SATA drives. For simplicity, a 1:1 ratio of SDMD to SATA drive is shown. However, as will be described later, an SDMD may interface with multiple SATA drives.

A first SATA drive 206a is connected to the SAS domain 202 via a first SDMD 204a. Similarly, a second SATA drive 206b is connected to the SAS domain 202 via the a second SDMD 204b and an Nth SATA drive 206c is connected to the SAS domain 202 via an Nth SDMD 206c. Various intermediary devices, such as expanders, may be located on data pathways between the SATA drives and STP Initiators within the SAS domain 202.

Each of the SDMD 206a, 206b, 206c receives data from a SATA drive at a first, lower rate. This data is buffered internally with the particular SDMD and transmitted to the SAS domain 202 at a second rate, which is higher than the first rate. Because of the internal buffering and different data rates, the data communicated from an SDMD to the SAS domain 202 is in one continuous and highly efficient burst. Various control methods and load balancing techniques may be employed within the SDMD to control when data is transmitted from a particular SDMD.

B. SAS Domain with SATA and SAS Drives

Figure 3:
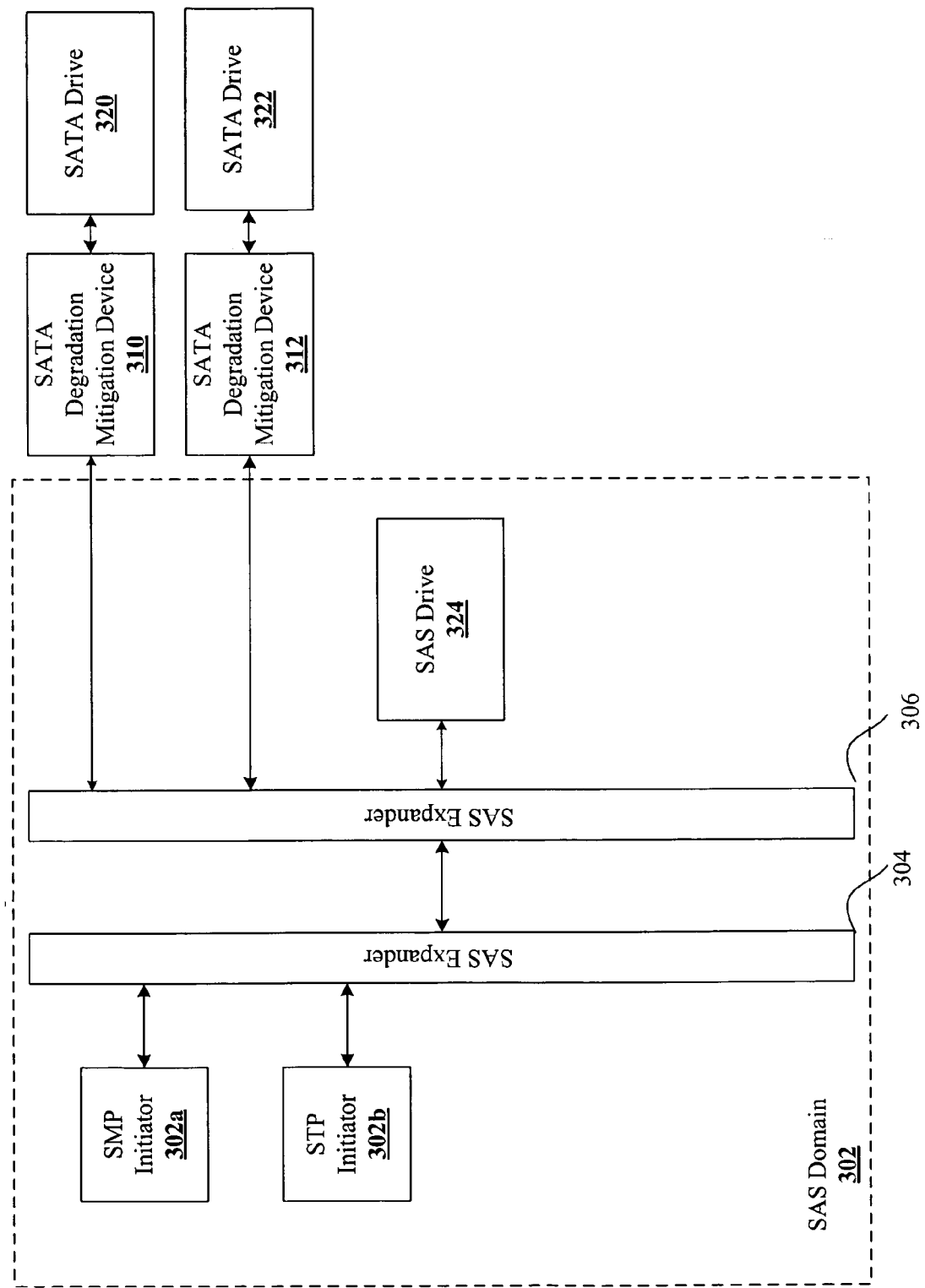
FIG. 3 illustrates an exemplary SAS domain incorporating SAS drives and SATA drives connected through expanders and SDMDs according to one embodiment of the invention.

FIG. 3 illustrates an exemplary topology in which a SAS domain contains SAS drives and also interfaces with SATA drives according to one embodiment of the invention. A SAS drive 324 may be connected directly to the SSP Initiator within the SAS domain 302 or may have an intermediary expander or expanders. In this particular example, the SAS drive is coupled to the SSP Initiator within the SAS domain 302 by a first expander 304 and a second expander 306.

A first SATA drive 320 is coupled to a first SDMD 310, which is coupled to the first and second expanders 304 and 306. A second drive 322 is coupled to a second SDMD 312, which is coupled to the first and second expanders 304 and 306. It is important to note that expanders may also be located between the SATA drives and the SDMDs, or the SDMDs may be integrated within an expander or SATA drive.

Various SAS Initiators may be interconnected using expander devices enabling the SATA or SAS drives to be used by multiple Initiators. The drives along with the various expander and SAS end devices thereby form a storage network. As described above, the SDMDs when implemented in such a domain, form part of the network, improving the rate at which data is communicated to STP Initiators in the SAS domain.

The SAS topology is designed to be compliant with existing ATA applications. An STP Initiator 302b is provided that receives data from the SATA drives 320, 322 and operates in accordance with the Serial ATA Tunneling Protocol. An SSP Initiator 302a is provided that communicates with SAS drive 324 and operates in accordance with the Serial SCSI Protocol. The Initiators 302a, 302b and the SDMDs 310, 312 may be separated by one or more expanders. The presence of expanders may improve performance of the storage system and increase the scalability of the SAS domain by allowing multiple drives to be connected to a single Initiator.

As described above, the low data rates associated with the SATA drives 320 and 322 may create congestion on or between the first expander 304 and the second expander 306. This congestion may effectively block or limit the more efficient data transfer between the SAS drive 324 and the SSP Initiator 302a.

The SDMDs 310, 312 reduce this congestion by buffering read data from the SATA drives and transmitting the buffered data at a higher rate, or conversely buffer write data from the STP Initiator and then transmitting the buffered data at a lower rate to the SATA drive. In one embodiment of the invention, the higher transmission rate is at least twice as fast as the rate at which data is received from the SATA drives. For example, SATA drive link rates may operate at 1.5 Gbps and the SDMDs may accelerate this transfer to approximately 3 Gbps. Beyond that, any flow control introduced by the SATA drive may be eliminated after buffering, allowing the data transfer with the STP Initiator to be significantly greater than twice as fast. The control of the data buffering and transmission may be further enhanced by various techniques that may maximize, or otherwise increase, the total amount of data throughput between the SAS domain 302 and the drives.

C. SATA Degradation Mitigation Device

Figure 4:
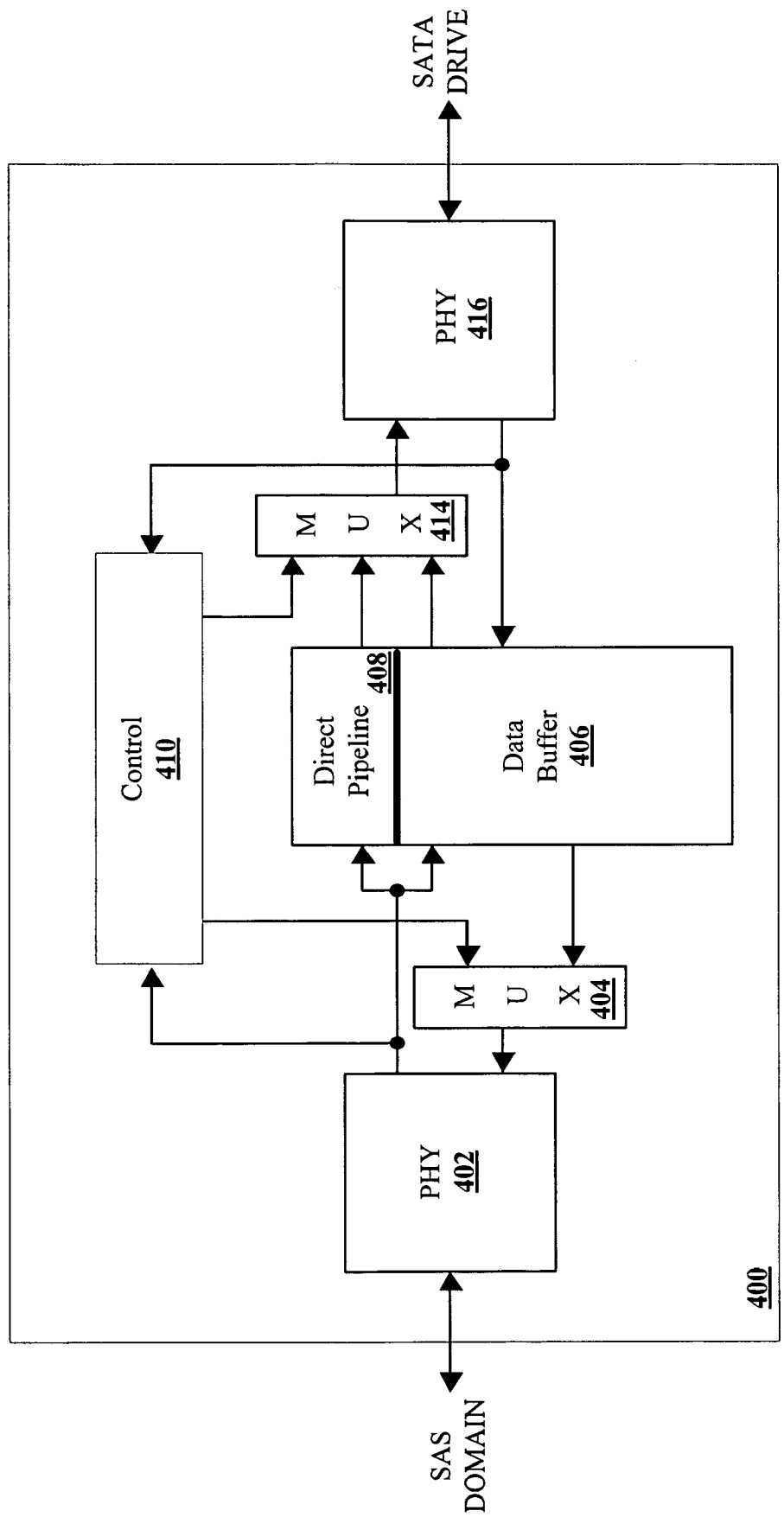
FIG. 4 illustrates a block diagram of an SDMD according to one embodiment of the present invention.

FIG. 4 shows a block diagram of a SATA Degradation Mitigation Device according to one embodiment of the present invention. The SDMD 400 provides a plurality of modes in which the device may operate. A first mode provides a direct pipeline 408 in which data or commands are forwarded between the SAS domain and the SATA drive. A second mode provides a data buffer 406 in which data is buffered and subsequently transmitted between the SAS domain and the SATA drive. In one embodiment, data is buffered at the SDMD, allowing the data transfers between the SDMD and the SAS domain to occur at a relatively higher rate than data transfers between the SDMD and the SATA drive.

The specific component design illustrated in FIG. 4 is intended to be exemplary and one skilled in the art will recognize that various other designs may be employed to achieve the above described functionality. In this particular example, the SDMD 400 comprises control logic 410, which controls a data buffer 406, and multiplexers 404, 414, and may also control other components. The control logic 410 monitors command and data flow between SATA drives and the SAS domain to control the various components of the SDMD 400. The multiplexers 404 and 414 multiplex data and commands into a data stream that is sent to PHY 402 and 416 based on the various inputs and the control 410 commands. A data buffer 406 is located between the two PHYs 402, 416 to store data communicated between the SATA drive and SAS domain such as data Frame Information Structures ("FIS").

The SDMD 400 may operate in multiple modes depending on the direction of data and/or commands that are flowing through the device.

a) First Mode—Command and/or Data Flow Through

The SDMD 400 operates in a first mode when commands and/or data between the SATA drive and the SAS domain are communicated on the direct pipeline 408 which allows the control logic to monitor control traffic between the SATA drive and the SAS domain. This monitoring allows the SDMD 400 to intercept control traffic and respond accordingly, such as taking over a data transfer from a SATA drive to the SAS domain.

This direct data flow through the SDMD may occur in either direction between the SAS domain and the SATA drive. As illustrated in FIG. 4, data and/or commands received from the SAS domain may be forwarded on the direct pipeline 406 while being monitored by the control logic 410.

Figure 5:
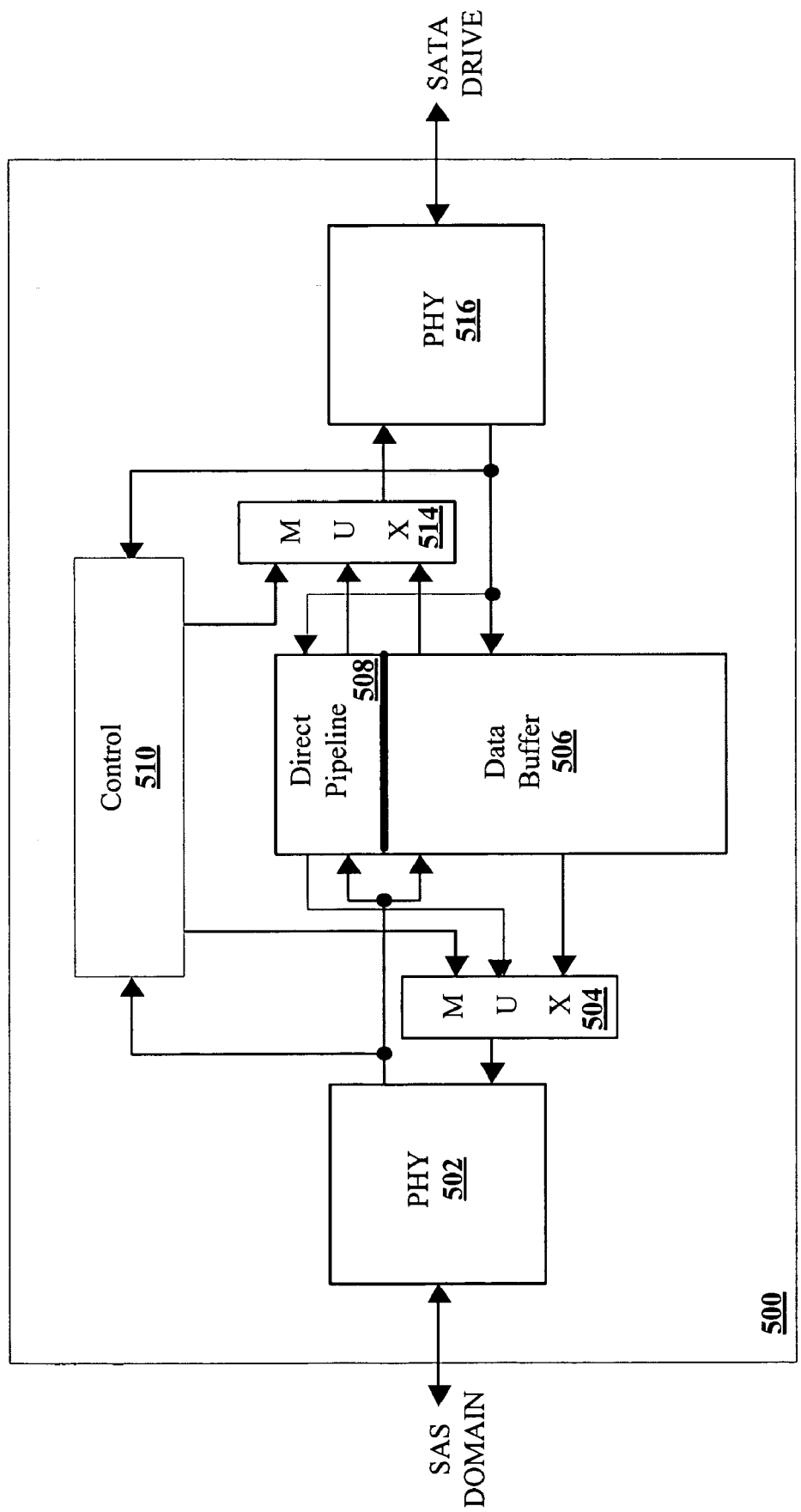
FIG. 5 illustrates a block diagram of an SDMD according to another embodiment of the present invention.

Referring to FIG. 5, the first mode may also operate in which data received from the SATA drive is not buffered but transmitted through a direct pipeline 508 to a multiplexer 504 and PHY 502. This data path allows the SDMD 500 to skip the buffering process and provide a flow through path in which data from a SATA drive is forwarded through the SDMD 500 and transmitted to the SAS domain. This data path may be used to forward commands or status information from the SATA drive to the SAS domain. This path may also be used in various situations including when there is very little data flowing between the SAS domain and other drives, or when resources on the SDMD 500 are required for other operations.

b) Second Mode—Data Buffer

The SDMD 400 operates in a second mode when commands and/or data between the SATA drive and the SAS domain are buffered within the data buffer 406 and subsequently transferred to either the SATA drive or SAS domain. In this second mode, data traveling in either direction between the SATA drive and the SAS domain may be buffered.

The control logic 410 monitors these data transfer and checks the status of the data buffer 406, and also monitors data flow information within the SDMD 400 and on intermediary devices between the SDMD 400 and one or more STP Initiators. The data path from the data buffer 406 to multiplexer 404 and PHY 402 leading to the intermediary devices or SAS domain is controlled by the control logic 410. Based on the data traffic and amount of data within the data buffer 406, the control logic 410 takes over and handles the actual data transfer, interacting with DMA setup, DMA activate, PIO setup and other SATA FISes appropriately. In addition, the control logic 410 may respond to flow control signals from the SATA Drive and STP Initiator, placing only valid data in the data buffer 406.

As previously described, data from a SATA drive is received at a lower rate and buffered. The control logic 410 monitors the amount of data within the data buffer 406 and causes the buffered data to be sent to a first multiplexer 404 that selects the buffered data instead of control information. This elimination of control information may further improve the performance of the system by reducing the amount of data that is subsequently transmitted to the SAS domain. This multiplexed data is sent to the PHY 402 where it is subsequently transmitted to the SAS domain, perhaps via intermediary devices, at a relatively higher rate than the data was received from the SATA drive. In one embodiment of the invention, data is stored within the data buffer 406 until a complete transaction is completely stored. Thereafter, the data within the transaction is transmitted to the SAS domain.

Data received from the SAS domain may be transmitted to the SATA drive via the SDMD 400. In one embodiment, data (e.g., write data) is received from the SAS domain and stored within the data buffer 406. The control logic 410 monitors the amount of data within the data buffer 406 and causes the buffered data to be sent to a second multiplexer 414 that selects the buffered data instead of control information. This multiplexed data is sent to the PHY 416 where it is subsequently transmitted to the SATA drive at a relatively lower rate than the data was received from the SAS domain. In one embodiment of the invention, data is stored within the data buffer 406 until a complete transaction is completely stored. Thereafter, the data within the transaction is transmitted to the SATA drive.

While the present invention has been described with reference to certain exemplary embodiments, those skilled in the art will recognize that various modifications may be provided. Accordingly, the scope of the invention is to be limited only by the following claims.

What is claimed is:

1. A device for mitigating performance degradation within a storage system, the device comprising:
   a first interface on which data is received at a first rate from a first disk drive;
   a data buffer coupled to receive the data from the first interface and store the data;
   control logic, coupled to the data buffer, that controls the transmission of the stored data from the data buffer at a second rate that is faster than the first rate;
   a first multiplexer, coupled to the data buffer and the control logic, that selects the stored data and removes at least a portion of the control information; and
   a second interface on which the stored data is sent to a controller domain within the storage system.

2. The device of claim 1 wherein the first disk drive is a Serial ATA disk drive.

3. The device of claim 1 wherein the controller domain within the storage system is a Serial Attached SCSI domain.

4. The device of claim 1 further comprising a direct pipeline, coupled between first interface and the first multiplexer, in which data and commands from the disk drive are forwarded from the first disk drive to the second interface without being buffered within the data buffer.

5. The device of claim 1 wherein the control logic monitors the amount of data stored within the data buffer to decide when the stored data is sent from the data buffer to the first multiplexer.

6. The device of claim 1 wherein the device is integrated within an expander within the storage system.

7. The device of claim 1 wherein the device is integrated within the first disk drive.

8. The device of claim 1 wherein the device is integrated within a STP/SATA bridge.

9. The device of claim 1 wherein the device is a standalone component within a storage system.

10. The device of claim 1 wherein:
   the second interface receives data from the controller domain within the storage system;
   the data buffer stores the data received on the second interface;
   the control logic controls the transmission of the data from the data buffer at a second rate that is lower than the first rate;
   a second multiplexer, coupled to the data buffer and the control logic, that selects the stored data and removes at least a portion of the control information; and
   the first interface on which the selected stored data is sent to the first disk drive.

11. The device of claim 10 wherein the control logic monitors the amount of data stored within the data buffer to decide when the stored data is sent from the data buffer to the second multiplexer.

12. The device of claim 11 wherein the data from the controller domain is transmitted from the second interface to a direct pipeline, coupled between the first interface and the second interface, in which the data is forwarded from the second interface to the first interface without being buffered within the data buffer.

13. A storage system comprising:
   a SAS domain that communicates with a plurality of disk drives;
   a SATA drive, within the plurality of disk drives, that communicates with the SAS domain at a first rate;
   a SAS drive, within the plurality of disk drives, that communicates with the SAS domain at a second rate that is faster than the first rate;
   a SATA degradation mitigation device, coupled between the SAS domain and the SATA drive, that receive data from the SATA drive at the first rate and transmits the data to the SAS domain at the second rate.

14. The storage system of claim 13 wherein the SATA degradation mitigation device comprises a data buffer that receives and stores data at the first rate from the SATA drive, and transmits the data to the SAS domain at the second rate.

15. The storage system of claim 13 wherein the data buffer also receives and stores data and commands from the SAS domain, and transmits the data to the SATA disk.

16. The storage system of claim 13 further comprising a plurality of expanders, coupled between the SAS domain and the plurality of disk drives, that increase the number of devices with which the SAS domain may interface.

17. The storage system of claim 13 further comprising a plurality of expanders, coupled within the SAS domain and the plurality of disk drives, that increase the number of devices with which the SAS domain may interface.

18. The storage system of claim 17 wherein the SATA degradation mitigation device is integrated within one expander within the plurality of expanders.

19. The storage system of claim 13 wherein the SATA degradation mitigation device is integrated within the SATA drive.

20. The storage system of claim 13 wherein the SATA degradation mitigation device is integrated within a STP/SATA bridge.

21. The storage system of claim 13 wherein the SATA degradation mitigation device is a stand alone component within the storage system.

22. The storage system of claim 13 wherein the SATA degradation mitigation device comprises a direct pipeline in which data and commands are transmitted between the SATA drive and the SAS domain without being buffered.

23. A method for mitigating performance degradation caused by data transfers from a SATA drive to a SAS domain, the method comprising:
   monitoring data traffic between the SATA drive and the SAS domain;
   identifying a data transfer from the SATA drive to the SAS domain having a first data rate;
   buffering the data transfer within a data buffer located between the SATA drive and the SAS domain; and
   transmitting the buffered data to the SAS domain at a second data rate that is faster than the first data rate.

24. The method of claim 23 wherein the first date rate is defined to be 1.5 Gbps and the second data rate is defined to be 3.0 Gbps.

25. The method of claim 23 wherein the first data rate is defined to be 1.5 Gbps and the second data rate is defined to be 6.0 Gbps.

26. The method of claim 23 wherein the first data rate is defined to be 3.0 Gbps and the second data rate is defined to be 6.0 Gbps.

27. The method of claim 23 wherein the transmitted data to the SAS domain has at least a portion of flow control data removed that was present in the data from the SATA drive.

28. The method of claim 23 wherein the data buffer is located on the SATA drive.

29. The method of claim 23 wherein the data buffer is located on an expander between the SATA drive and the SAS domain.

30. The method of claim 23 wherein the data buffer is located on an STP/SATA bridge.

31. The method of claim 23 wherein the data buffer is a stand alone component with a system.

32. The method of claim 23 further comprising the step of multiplexing control information and the buffered data prior to transmission to the SAS domain.

33. The method of claim 23 further comprising the step of providing a pipeline on which information between the SAS domain and the SATA drive may be communicated without being buffered.

34. The method of claim 33 wherein control logic monitors information communicated on the pipeline to identify the data transfer from the SATA drive.

* * * * *